Nov. 28, 1950 R. S. BAILEY 2,531,384
POLYPHASE CYCLOTRON
Filed Sept. 20, 1947 3 Sheets-Sheet 1

INVENTOR.
ROBERT S. BAILEY
BY
ATTORNEY

Nov. 28, 1950 R. S. BAILEY 2,531,384
POLYPHASE CYCLOTRON
Filed Sept. 20, 1947 3 Sheets-Sheet 2

INVENTOR.
ROBERT S. BAILEY
BY
R P Morris
ATTORNEY

Nov. 28, 1950 R. S. BAILEY 2,531,384
POLYPHASE CYCLOTRON
Filed Sept. 20, 1947 3 Sheets-Sheet 3

INVENTOR.
ROBERT S. BAILEY
BY
*R. P. Morris*
ATTORNEY

Patented Nov. 28, 1950

2,531,384

UNITED STATES PATENT OFFICE 2,531,384

POLYPHASE CYCLOTRON

Robert S. Bailey, New York, N. Y., assignor to International Standard Electric Corporation, New York, N. Y., a corporation of Delaware Application September 20, 1947, Serial No. 775,312

13 Claims. (Cl. 250—27)

This invention relates to particle accelerators and more particularly to devices for producing accelerated particles such as electrons, ions, hydrogen nuclei, and the like, with exceedingly high final velocities.

A principal object of the invention is to provide a device for producing highly accelerated particles at a velocity approaching the speed of light, and wherein the apparent change in mass of the particles at such high velocities is effectively utilized to increase the final particle energy which is attainable.

Another object is to provide a device for producing highly accelerated particles by using a particle-accelerated field of the rotating type.

Another object is to provide an improved particle-accelerating device of the "cyclotron" type, wherein a rotating accelerating field is employed, and the drift chambers or segments are designed and correlated with the rotating field to increase the final particle velocity which is attainable.

A feature of the invention relates to a device for producing highly-accelerated particles employing a plurality of successively effective particle-accelerating electrodes, which are energized by a polyphase alternating current whose phases are correlated with the particle drift time between successive electrodes, so that each electrode produces a maximum field gradient just as the particle comes within its influence.

Another feature relates to a device for producing highly-accelerated particles employing an electron or ion gun and a plurality of successively effective particle-accelerating electrodes which are excited by a rotating field produced by a polyphase alternating current, together with means for pulsing the beam from the particle gun in predetermined timed relation with the rate of rotation of said field, so that the gun emits particles only during the range when each phase of the alternating current is undergoing a maximum potential gradient.

Another feature relates to a particle accelerator of the "cyclotron" type wherein the drift chambers are especially designed to act as special wave energy transmission lines, so that the wave transmission characteristics, looking from the inner to the outer margin of each chamber are correlated with the orbital velocities of the particles and their relativistic mass increase. As a result of this feature it is possible to extend very greatly the final attainable particle acceleration, by taking into account the apparent increase in mass of the electrons as they approach the velocity of light.

A further feature relates to the novel organization of apparatus and electric circuits which cooperate to provide an improved particle accelerator of the "cyclotron" type.

Other features and advantages will appear from the ensuing description and the appended claims.

In the drawing which shows, by way of example, certain embodiments,

Figure 1:
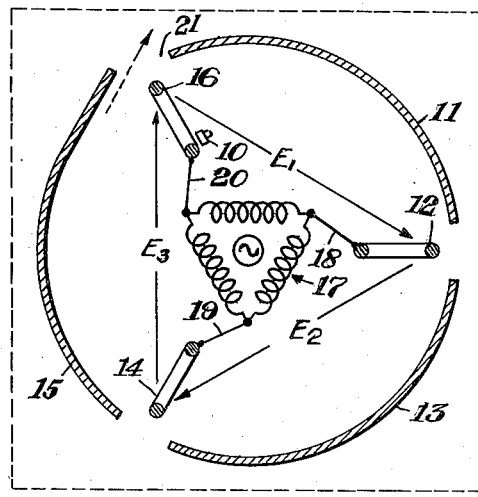
Fig. 1 is a schematic diagram of a particle accelerator embodying features of the invention.

Referring to Fig. 1, there is shown in schematic form, a particle-accelerating device comprising a particle gun 10 of any well-known construction, for developing a well-defined beam of high velocity particles. Mounted in the path of the beam is a beam-controlling member 11 which may take the form of a curved metal plate connected to a suitable biassing potential to cause the beam to follow a curved trajectory or orbit. This trajectory is such that the beam is constrained to pass through a first accelerating metal ring 12. Mounted adjacent ring 12 is another beam-controlling plate 13 which is suitably negative to cause the beam leaving ring 12 to follow a curved trajectory or orbit so that it is constrained to move through a second accelerating metal ring 14. Likewise mounted adjacent ring 14 is another beam-controlling member 15 for causing the beam to pass through the third accelerating ring 16.

In accordance with one feature of the invention, the accelerating electrodes or rings 12, 14, 16 are energized by voltage from a suitable polyphase alternating current source, such for example as the three-phase radio frequency oscillator 17. The phases of this oscillator can be connected in star or delta respectively to the rings 12, 14, 16. It will be understood that the parts 10—16 are mounted within a suitable casing or enclosure represented schematically by the dotted rectangle, which can be evacuated. Suitable lead-ins 18, 19, 20, are provided through the casing to connect the accelerating rings to the appropriate terminals of oscillator 17. With such an arrangement there is produced a rotating field whose rate of rotation is a function of the oscillator frequency. The length of the path each particle travels and the strength of the field will determine the final velocity increase per cycle of the alternating current. Thus the electrons, ions, hydrogen nuclei, etc. can be given very high final velocities, arbitrarily near the velocity of light. At these velocities there is a relativistic increase in mass. Consequently the electrons or particles having the higher velocities will traverse larger orbital paths. Therefore, if desired, a particle emergence port 21 may be provided at an appropriate point to allow the particles of higher velocity to pass from the device. These high velocity particles can then be made to strike a desired target with resultant emission of radiative energy such as X-rays, cosmic rays, light rays, or they may be used for the fission of atomic nuclei.

Figure 2:
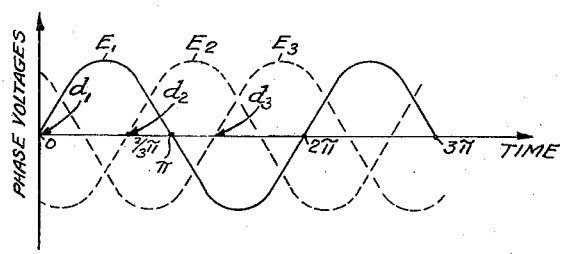
Fig. 2 are curves of the polyphase field excitation voltage used with the device of Fig. 1.

Merely for purposes of explanation, a three-phase radio frequency oscillator is shown in Fig. 1, but it will be understood that any other polyphase alternating current source can be used to produce the rotating field. In the case of a three-phase radio frequency oscillator, it is known that the phase-to-phase voltage is $\sqrt{3}$ times the voltage of each of the three phases with respect to ground. Thus a voltage gradient will exist in each of the phases and they are designated in Fig. 1 as $E_1$, $E_2$, $E_3$. For purposes of explanation, it may be assumed that an electron is the desired particle to be accelerated. In that case a positive accelerating field is required, as represented by the directional arrows in Fig. 1, which correspond to the initial direction of emission from the gun 10. Fig. 2 shows the time-versus-phase voltage characteristic of a typical three-phase oscillator with the three-phase voltages indicated thereon. Consider, for example, an electron injected into phase #1 at time 0, it will be seen that this electron is subject to a positive accelerating voltage gradient in said field for one-half cycle of the excitation frequency of said field. However, it will also be seen that phase #2 possesses a positive accelerating field beginning at $\frac{2}{3}\pi$. Thus electrons injected into phase #1 may be passed to phase #2 as early as $\frac{2}{3}$ of a half cycle after they are injected into phase #2, because at this time phase #2 will present the proper accelerating condition in the form of a positive voltage gradient. The time of flight of the electron in phase #1 is a function of the distance it must travel as well as of the accelerating voltage gradient and the mass of the electron. It is known that this mass is a variable function of the velocity of the electron and is related to it by the following formula:

$$m_v = \frac{m_0}{\sqrt{1-(v/c)^2}} \quad (1)$$

whereby its mass $m_v$ at a given velocity appears to increase as the velocity $v$ approaches $c$ the velocity of light. This increase in mass results in appreciable increase over the rest mass $m_0$. The ratio of these two masses may be several hundred for velocities very close to that of light. Thus a three-phase accelerator may have electrons injected into phase #1 for a time interval corresponding to the electron flight in said phase, the physical dimensions of the accelerating chamber being such as to insure that all the electrons injected into phase #1 arrive in phase #2 at a time when phase #2 presents a positive accelerating voltage gradient. Optimum conditions will be obtained when a group of electrons is injected into phase #1 at such initial velocity and at such time durations that said group rotates about the orbit in substantially positive accelerating fields throughout all of their rotations around the center. Thus each electron will obtain a greater velocity as it passes through each phase and may be rotated an arbitrary number of times throughout its orbit to obtain a corresponding arbitrarily increased velocity. The electrons may be ejected from their orbits for example by subjecting the radio frequency field to a pulsing operation to cause the electrons to pass out of the field, or reliance may be placed upon the increase in mass and velocity of the electrons enabling them to emerge from the opening 21. A separate electrode, not shown, may be used to eject the electrons if desired.

While an electron travelling a circular orbit will exhibit certain centrifugal forces tending to drive it out of its orbit, these may be counteracted by any one of several known means. For example, electron lenses may be placed about the orbit so as to keep the electron in its desired orbit, or if desired a magnetic field perpendicular to the direction of flight may be established to cause it to follow a circular path as is done in the conventional "cyclotron."

Figure 3:
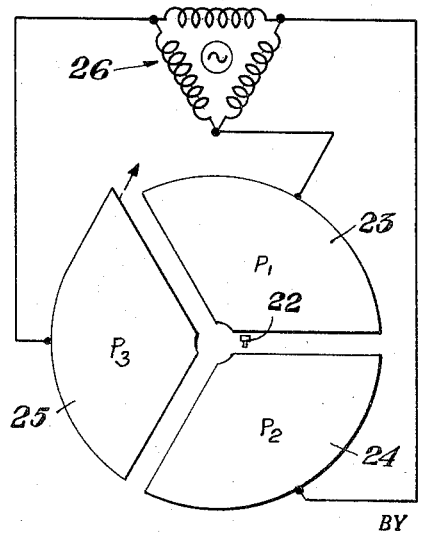
Fig. 3 is a modification of Fig. 1.

Thus, as shown in Fig. 3, the electron gun 22 can be associated with three drift chambers 23, 24, 25 similar to the conventional drift members of a "cyclotron." In this case, however, the chambers 23, 24, 25 instead of being semi-circular, are in the form of approximately 120° segments each of the segments being respectively connected to a corresponding phase of the three-phase radio frequency oscillator 26. A magnetic field is then established perpendicular to the chambers 23, 24 and 25 to provide a restoring force to counterbalance the centrifugal force on the particles to be accelerated.

If, instead of electrostatic focussing as shown in Fig. 1, it is desired to use magnetic focussing as in the conventional cyclotron and as shown in Fig. 3 it can be shown that the fundamental equations of motion of particles in the cyclotron are $$Hev = \frac{m_v v^2}{r} \quad (2)$$

$$t = \frac{2m_v \pi}{He} \quad (3)$$

where:
$H$ is magnetic field strength
$e$ is charge on each particle
$v$ is the velocity of the particle
$r$ is the radius of the particle path
$t$ is the time for one revolution of the particle mass.

From these equations it is possible to derive $$t = \frac{2\pi}{Hec}\sqrt{(m_0 c)^2 + (Her)^2} \quad (4)$$

which illustrates the variation in time for one revolution of a particle as the radius increases. It is seen that this time increases as the radius, and hence the velocity, of the particle increases.

One of the drawbacks to the conventional "cyclotron" is that because of the relativistic change in mass of the particles as they reach their higher velocities, they depart from the periodic motion they possessed at low velocities, and the higher velocity electrons arrive out of phase with the periodic accelerating electrostatic forces. This objection can, according to the invention, be overcome both in the conventional "cyclotron" and in the polyphase "cyclotron" of Figs. 1 and 3. Thus, as shown in Fig. 4, the drift chambers 26, 27 and 28 energized by source 29 form three transmission lines terminated in three impedances 30, 31, 32.

It is well known that the velocity of propagation in such transmission lines may be altered by inserting dielectric material or otherwise changing the distributed capacitance of the line as well as by varying the distributed inductance by inserting permeable material, etc.

Equation 4 has shown that particles near the outer edges of high velocity accelerators will arrive "late" due to relativistic mass increase. Hence, according to the invention, the transmission lines shown in Fig. 4 may be adjusted to provide a phase delay exactly equal to the delay in particle arrival at the accelerating gap.

Figure 4:
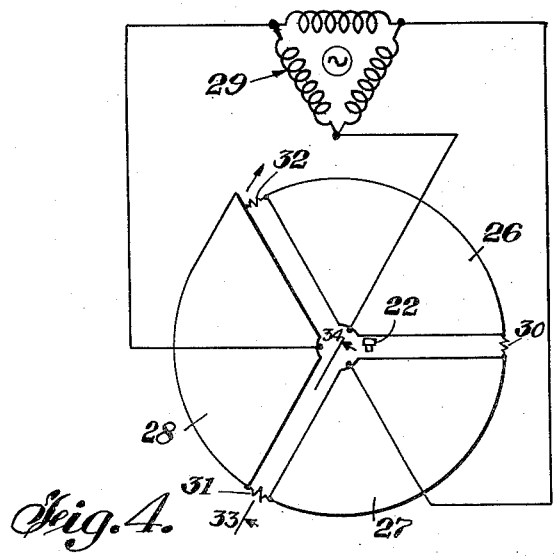
Fig. 4 is another modification of Fig. 1 illustrating another feature of the invention.
Figure 5:
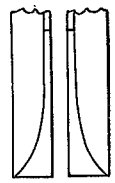
Fig. 5 is a cross-sectional view of part of Fig. 4.

This may be accomplished in many ways, one of which is shown in Fig. 5 which is a section of Fig. 4 along the line 33—34. In this case the dimensions of the transmission line, that is the thickness of the plate edges and thus the edge surfaces have been increased as the radius increases in accordance with Formula 4 and the well known transmission line equations to provide an increase in the distributed capacitance of the line and a consequent reduction in its velocity of propagation as the radius increases. Alternatively, the line may be kept constant in dimension and a variable distributed inductance inserted or a dielectric material inserted in increasing amount, or other methods apparent to those skilled in the art may be used.

The terminations 30, 31, and 32 may preferably be such as to terminate the lines in their characteristic impedance and thereby avoid reflections of energy.

Figure 6:
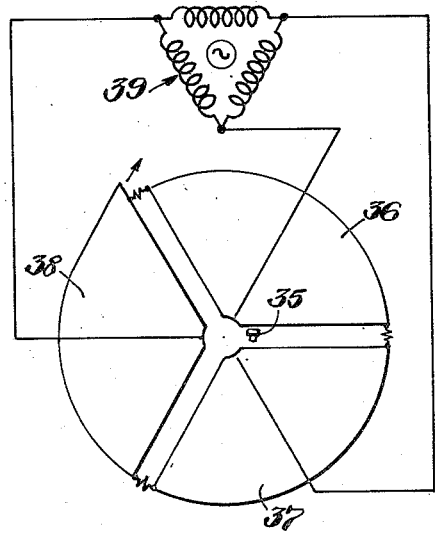
Fig. 6 represents another modification of the invention.
Figure 7:
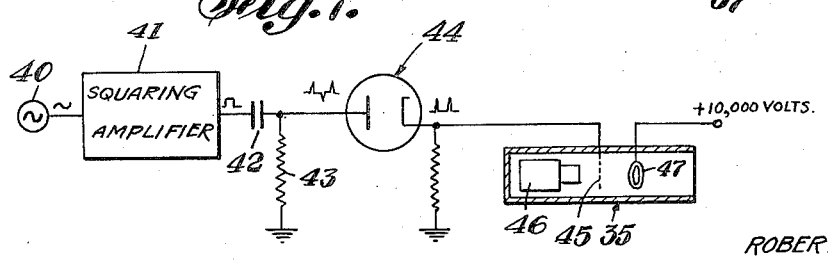
Fig. 7 is a schematic wiring diagram of one circuit arrangement for controlling the timing of the polyphase excitation field of Fig. 6.

I have found that it is possible to increase the operating efficiency of the polyphase "cyclotron" such as shown in any of the preceding embodiments, by pulsing the electron gun at such time intervals as the corresponding phases are undergoing their maximum voltage gradients represented in Fig. 2 by the points $d_1$, $d_2$, $d_3$. An arrangement for accomplishing this result is schematically illustrated in Figs. 6 and 7. In Fig. 6 the electron gun 35 is associated with three drift chambers 36, 37, 38 which are excited by the three-phase radio frequency oscillator 39 as above described. However, the gun, instead of emitting electrons continuously, is blanked-off at regularly timed intervals to correspond with the intervals between $d_1$, $d_2$, $d_3$ (Fig. 2). For this purpose, there is provided a radio frequency oscillator 40 which has the same frequency as the oscillator 39. Oscillator 40 is connected to a squaring amplifier 41 to convert the sinusoidal waves into square-topped waves which are then passed through a pulsing or differentiating circuit comprising condenser 42 and resistor 43. These opposite polarity pulses are then rectified in a suitable rectifier 44 to produce the positive pulses which are applied to a control grid 45 which is located between the emitting cathode 46 and the high potential accelerating anode 47. The grid 45 is normally biassed so that the gun 35 is blanked-off except when the positive pulses from rectifier 44 are applied to grid 45 as above described.

Figure 8:
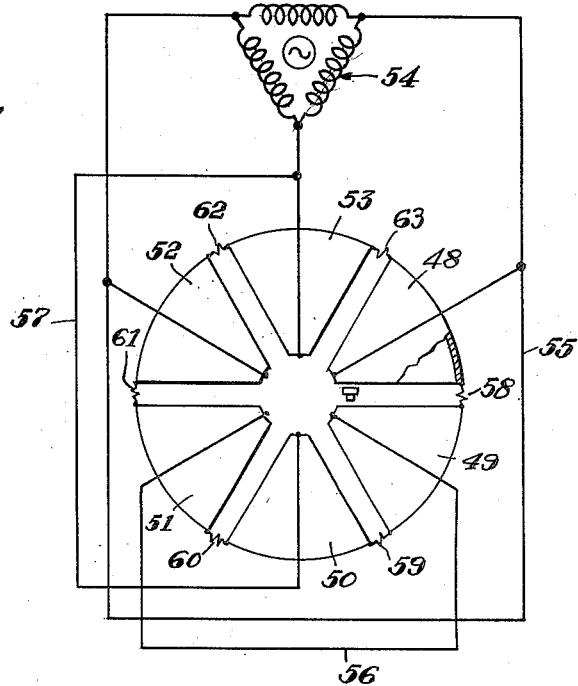
Fig. 8 is a still further modification of Fig. 1.

The invention is not limited to any particular number of phases for the radio frequency excitation, or to any particular number of cavity segment electrodes. Thus, as shown in Fig. 8, the "cyclotron" may have six cavity segments 48–53 which are excited by the three-phase radio frequency oscillator 54. In this embodiment, segments 48 and 51 are connected together by conductor 55; segments 49 and 52 are connected together by conductor 56; and segments 50 and 53 are connected together by conductor 57. If desired, the six segments 48–53 can be connected individually to the corresponding phases of a six-phase radio frequency oscillator. The usual particle gun 58 is of course provided, as well as the usual magnetic field (not shown) for causing the particles to follow spiral paths, in the manner well-known in the "cyclotron" art.

In addition terminating impedances 58–63 are provided for the transmission lines, and the transmission lines are adjusted to provide the required phase delay as explained above.

A further feature of the invention provides means to reduce the large capacities to ground offered by the accelerating plates of both conventional cyclotrons and multi-phase cyclotrons. These capacities in the case of many cyclotrons in use may be of the order of 1000 $\mu\mu f$. which causes a very low impedance to ground at the operating frequencies in use. These capacities may be partially neutralized by providing parallel inductive paths such as to cause parallel resonance between the capacitance and inductance.

Figure 9A:
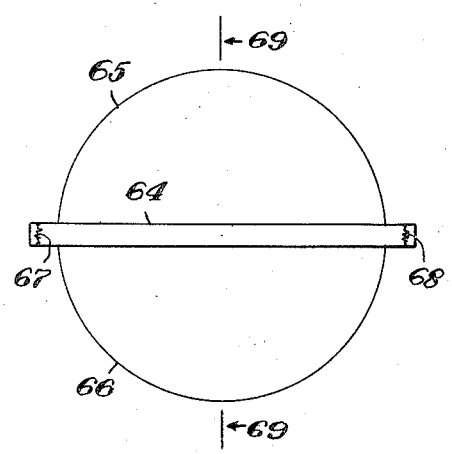
Figs. 9a and 9b represent another modification of the invention.

However, according to the invention as described in connection with Figs. 9a and 9b a more efficient method for avoiding the harmful effects of these capacities is to provide a wave guide transmission line 64 between the accelerating plates 65 and 66 which is fed at the center according to the principles previously discussed. Terminating impedances 67 and 68 are supplied to the outer ends of the wave guide to avoid energy reflections. Fig. 9a shows a plan view of the apparatus, diagrammatically illustrating the principles discussed above, while Fig. 9b shows a section of Fig. 9a along the line 69. A set of electric field lines 70 is shown for one possible mode of transmission in the guide 64.

Formula 4 has shown the time required for a particle to complete a full revolution in the apparatus and it is clear that an exciting frequency $f=1/t_1$ where $t_1$ is given by $t_1=2\pi m_0/He$ can be used provided propagation velocity along the transmission lines is corrected as discussed above. It is also clear that any integral harmonic of this frequency may be used in the case of the cyclotron shown in Figs. 9a and 9b. In the case of the multi-phase accelerators of Fig. 4 and Fig. 6 the fundamental excitation frequency may be $3/t_1$ and all integral harmonics. This relation may be extended for any number of phases $n$, to be $f=n/t_1$ and all integral harmonics.

Since operation of wave guides such as 64 requires relatively high frequencies when the wave guide dimensions are to be kept at a minimum, it is seen that, according to the invention, these higher frequencies may be chosen from the fundamental frequency and its integral harmonics in conjunction with the desired wave guide dimensions and physical constants of the accelerator.

The required reduction in the velocity of propagation in the wave guide 64 at increasing radii may be provided in many ways well known to those skilled in the art. For example, dielectric material, highly permeable material or other means for varying the distributed inductance, or variation of the dimensions of the guide 64 may be used to obtain the desired effect.

Although Figs. 9a and 9b have been described in connection with a single phase radio frequency source, it is clear that one of the multiphase embodiments previously shown may be utilized.

Figure 9B:
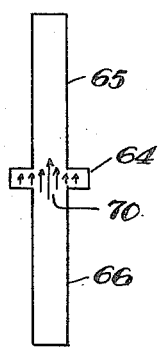

It is clear that, since all of the accelerating fields in Figs. 9a and 9b occur interior to the accelerating plates 65, 66 the capacities of these plates to ground will have negligible effect on the action of the device.

It is understood that a magnetic field is used in Figs. 9a and 9b to provide curvature of the path of the accelerated particles.

Various changes and modifications can be made in the disclosed embodiments, without departing from the spirit and scope of the invention.

What is claimed is:

1. A cyclotron energized by an N-phase high frequency energy source and having at least N-1 accelerating electrodes comprising at least N-1 wave transmission lines, coupling means from said lines to said source, delay means forming a part of said transmission lines, and terminating means for said lines.

2. In a particle accelerator of the cyclotron type a system for compensating for the orbital phase displacement of the particles due to an increase in relativistic mass, comprising a source of particles, accelerating electrode members, means for applying energy from an energy source to said electrode members at a given radial distance from the center of the particles, spiral path to provide an accelerating field, and phasing means coupled to said energy applying means for applying said energy at successively greater radial distances from said center to said members to provide further accelerating fields of different phase, said phasing means varying in value at successive distances from said center in proportion to the phase displacement of the particles due to their relativistic change in mass.

3. An accelerator as recited in claim 2, wherein said phasing means comprises wave transmission lines, at least one of the distributed electrical parameters of said lines having a substantially continuous variation along their length.

4. An accelerator as recited in claim 3, wherein there is means to extract energy from said lines comprising electrical terminating means at the extremities of said lines.

5. An accelerator as recited in claim 2 further comprising pulsing means electrically coupled to said particle source for intermittently supplying said particles in accordance with the occurrence of a positive accelerating field.

6. A particle accelerator of the cyclotron type comprising a source of particles including means for giving said particles an initial acceleration, a plurality of particle-accelerating electrically conductive chambers spaced from said source, and a polyphase source of high frequency excitation potential having its phases connected to respective chambers to subject said particles to a rotating electric field.

7. A particle acceleration according to claim 6 wherein said chambers define drift tubes dimensioned to correlate the flight of said particles with the rate of rotation of said electric field.

8. In a particle accelerator of the cyclotron type comprising, an electron gun for developing a beam of particles to be accelerated, a plurality of similar particle-accelerating electrodes each comprising a partially circular cavity segment, said segments being spaced from said gun and from each other to define a series of electron-accelerating regions, means connected to said electrodes to apply high frequency accelerating potentials to said electrodes in predetermined relative phase to successively accelerate the particles, said segments being proportioned to form wave transmission lines for said high frequency potentials, said lines having a high frequency phase delay characteristic variable along at least a portion of the length of said lines to compensate for relativistic mass increase of said particles.

9. A cyclotron as recited in claim 2, wherein said phasing means includes wave transmission means comprising at least one dielectric waveguide connected to said electrode members, said wave guide having a substantially continuous variation of the electrical parameters along its length.

10. A cyclotron as recited in claim 9, wherein said wave guide is electrically terminated whereby electrical reflections are eliminated in said waveguide.

11. In a particle accelerator in which the particles move rotationaly under the influence of a static magnetic field and a high frequency alternating electrical field; a source of particles, a source of high frequency energy, electrode means coupled to said high frequency source defining a plurality of accelerating gaps to accelerate said particles in their rotational paths, said electrode means forming passive wave transmission means, said passive transmission means correlating the delay in transmission of portions of said high frequency energy in correspondence with the delay in arrival of certain of said particles at the accelerating gaps.

12. A particle accelerator according to claim 11, wherein said transmission means are electrically terminated to eliminate electrical reflections in said transmission means.

13. In a particle accelerator as described, wherein the time for one revolution of one of said particles is given by $$t = \frac{2\pi}{Hec}\sqrt{(M_0C)^2 + (Her)^2}$$

where H is the strength of the magnetic field, e is the charge on each particle, v is the velocity of the particle, r is the radius of the particle path, $M_0$ is the mass of the electron at rest, and c is the velocity of light, comprising a source of particles, a high frequency source of frequency substantially $n/f$ where n is an integer, accelerating electrode members, means for applying energy from said high frequency source to said electrode members at a given radial distance from the center of the particles spiral path to provide an accelerating field, and phasing means coupled to said energy applying means for applying said energy at successively greater radial distances from said center to said members to provide further accelerating fields of different phase, said phasing means varying in value at successive distances from said center in proportion to the phase displacement of the particles due to their relativistic change in mass.

ROBERT S. BAILEY.

REFERENCES CITED

The following references are of record in the file of this patent:

UNITED STATES PATENTS

| Number | Name | Date |
|---|---|---|
| 1,533,278 | Slepian | Apr. 14, 1925 |
| 1,725,691 | Affel | Aug. 20, 1929 |
| 2,242,888 | Hollmann | May 20, 1947 |
| 2,265,113 | Dick | Dec. 2, 1941 |

FOREIGN PATENTS

| Number | Country | Date |
|---|---|---|
| 380,385 | Italy | May 11, 1940 |